Figure 4:
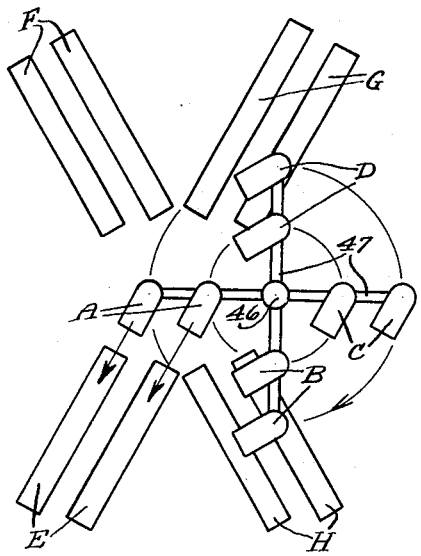

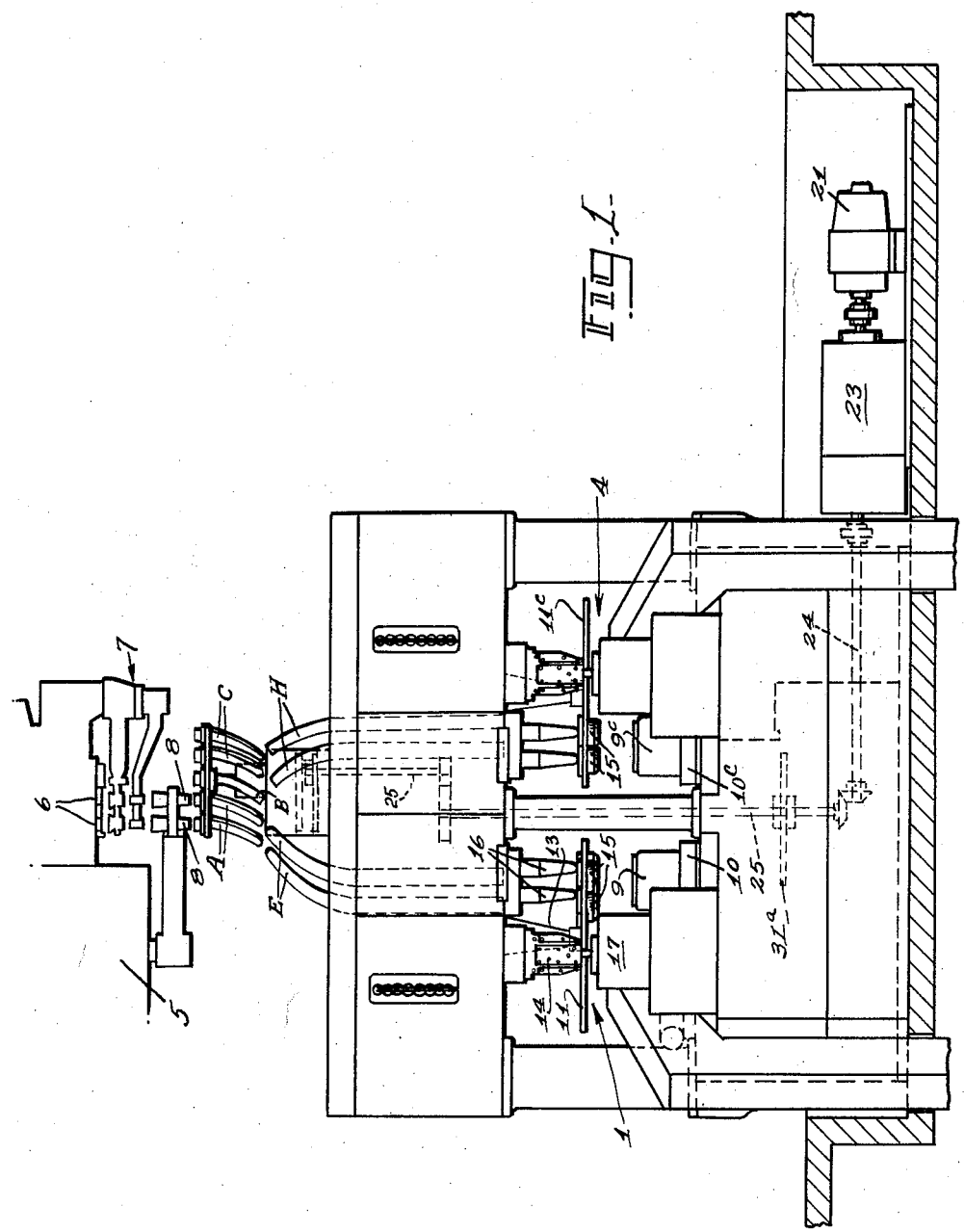

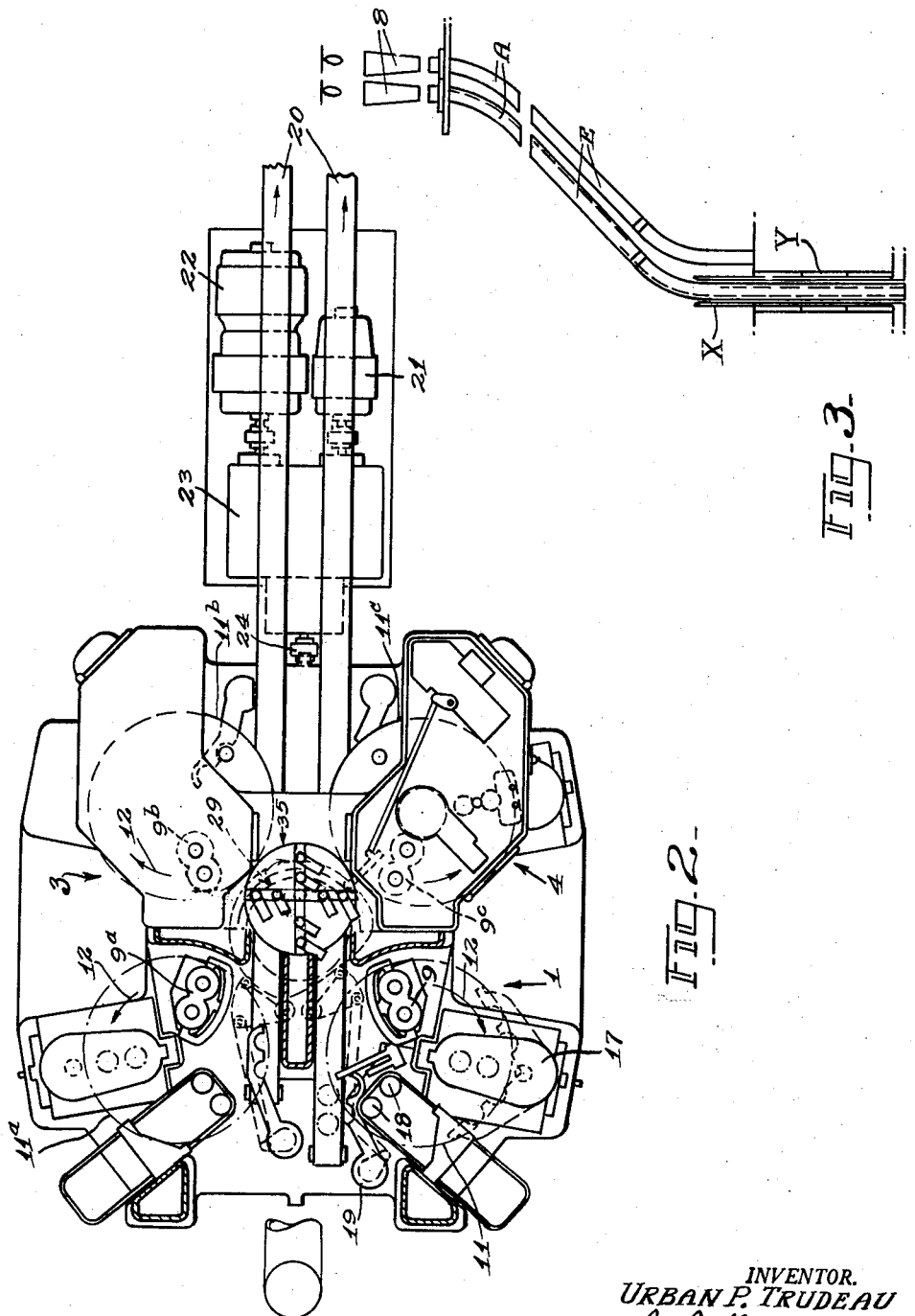

INVENTOR.
URBAN P. TRUDEAU
BY J. R. Nelson
W. A. Schaich
ATTORNEYS

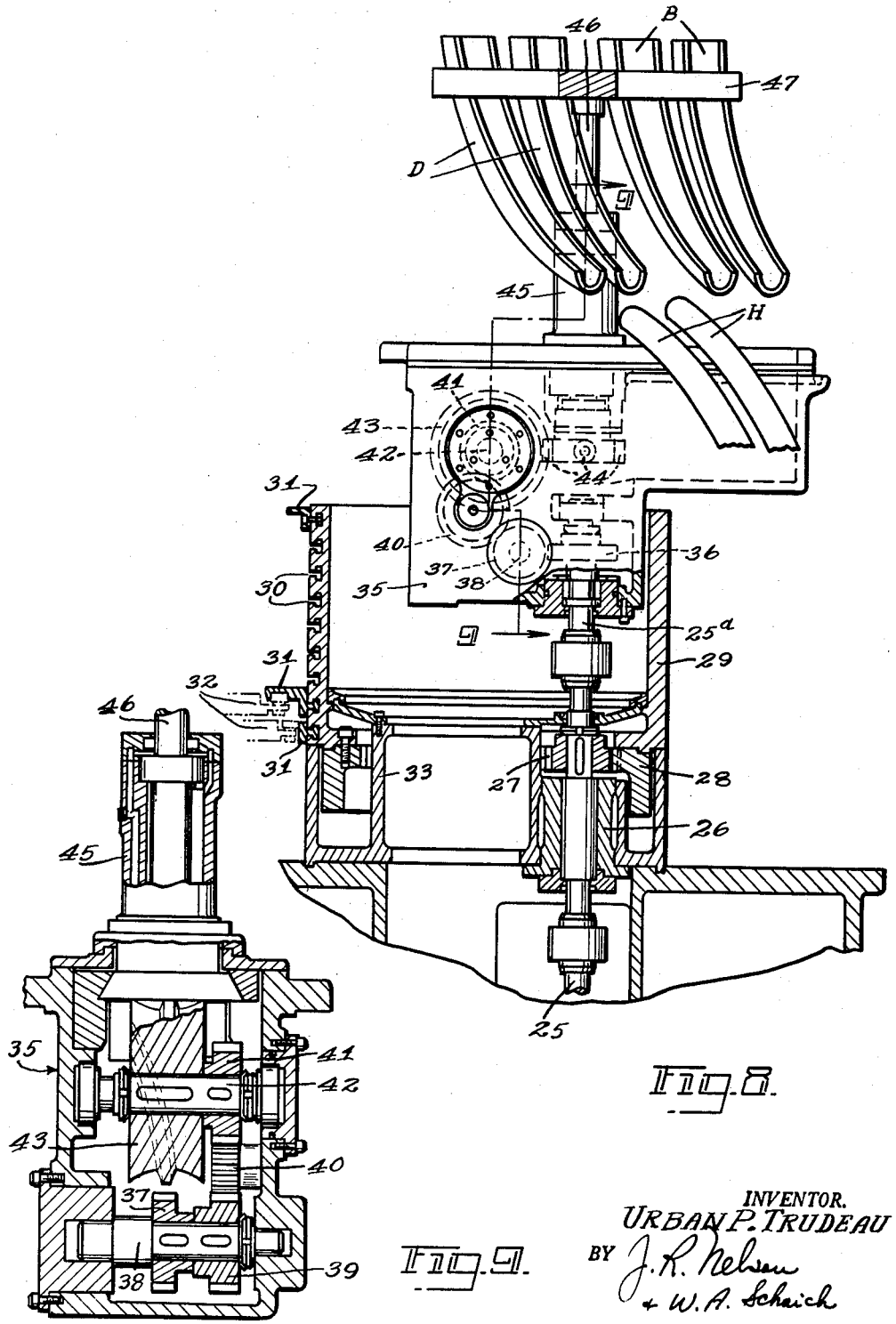

United States Patent Office 3,147,102
Patented Sept. 1, 1964

3,147,102
APPARATUS FOR DISTRIBUTING GOBS OF GLASS TO PLURAL FORMING MACHINES
Urban P. Trudeau, Toledo, Ohio, assignor to Owens-Illinois Glass Company, a corporation of Ohio
Filed Feb. 3, 1960, Ser. No. 6,431
2 Claims. (Cl. 65—225)

This invention relates to apparatus for distributing gobs of molten glass or other thermoplastic material from a plurality of orificial openings to a grouping of glass forming machines in succession.

In existing apparatus for distributing gobs of molten glass from a molten glass feeding and gob forming apparatus to a plurality of forming machines, it is the practice to use a plurality of individually reciprocated gob deflectors. An individual set of deflectors, when actuated, moves to a position beneath the feeder orifices and after deflecting formed gobs to a single forming machine the set is retracted. Plural sets of deflectors are necessary because these deflectors are fixed with respect to their direction of deflection and each set must be provided with its own reciprocating mechanisms. This type of gob guiding or deflecting arrangement was adequate until it became necessary to feed gobs at a faster rate. For example, if a group of four forming machines being fed in succession are individually indexed at two second intervals, it becomes necessary to position successively operated deflectors at one-half second intervals. This means that an individual set of deflectors must be positioned beneath the orifices, held long enough to receive and deflect gobs and then retracted to allow another set to be positioned, all this happening without interference between the individually operated deflectors, and within one-half second intervals between successive gobs or pairs of gobs falling from the gob forming apparatus. It thus becomes obvious that the reciprocating type deflectors associated with each machine would be required to move into and out of position beneath the feeder at such extremely high rates of speed as to be impractical. Because of this high rate of reciprocation, it is known from experience that a high degree of maintenance will occur over extended periods of operation of this type of deflector.

It is, therefore, an object of this invention to provide apparatus which is operable for controlling the delivery of gobs of molten glass at high rates of successive deflections and with a complete absence of interference as between the succeeding deflectors which act to direct the gobs of molten glass from the stationary orificial openings into a succession of forming machines located thereunder, and to further provide such an apparatus that is virtually free of mechanical breakdowns.

Another object of this invention is the provision of distributing apparatus for directing gobs of molten glass from stationary orificial openings in succession to a preselected grouping of forming machines located thereunder.

Another object of the invention is to provide apparatus for distributing double gobs from a double orifice feeder in succession to plural forming machines operated double gob and arranged in a circle, equally spaced from the center line of the feeder.

A further object of this invention is to provide apparatus for distributing double gobs of molten glass in succession to a grouping of forming machines wherein the path of travel of the gobs is of substantially the same length regardless of the machine being fed.

The specific nature of this invention, as well as other objects and advantages thereof, will become apparent to those skilled in the art from the following detailed description taken in conjunction with the annexed sheets of drawings on which, by way of example only, one embodiment of this invention is illustrated.

In the accompanying drawings:
FIG. 1 is a schematic elevational view of a group of glass forming machines in position below a feeder.
FIG. 2 is a schematic plan view of FIG. 1 and shown partially in section.
FIG. 3 is a schematic elevational view showing the paths followed by a pair of formed gobs being handled by one form of the apparatus of the invention.
FIGS. 4–7 are schematic plan views of the gob distributor of the invention showing somewhat diagrammatically its four positions of operation during rotation through one clockwise revolution of the distributor.
FIG. 8 is an enlarged schematic elevational view, partly in section, of the indexing mechanism for the gob distributor.
FIG. 9 is a sectional view, taken along the line 9—9 of FIG. 8.

This invention is primarily concerned with providing apparatus for delivering and distributing gobs of molten glass from a feeder to a plurality of glass forming machines or units spaced about the center line of the feeder.

Referring to FIGS. 1 and 2, there is generally shown four forming machines 1–4 spaced about a vertical axis and positioned below a forehearth 5 having a feeder 6 at the end thereof. The feeder 6 is of the double orifice type wherein the orifices are spaced equi-distant in front and back of the above mentioned vertical axis and are adapted to deliver pairs of gobs of molten glass to the forming machines in succession.

Mounted below the feeder 6 and connected to the forehearth structure is a conventional shearing mechanism 7 for forming the glass gobs by severing the molten glass, issuing from the feeder 6, into mold charges of glass of predetermined weight. The sheared gobs or mold charges fall by gravity through permanent guide funnels 8, positioned below and in vertical alignment with the orificial openings in the feeder 6, and onto pairs of generally elbow-shaped deflecting chutes or deflectors A, B, C, and D, depending upon which pair of deflectors has its receiving end positioned beneath the funnels 8. The deflecting chutes A, B, C, and D deflect the gobs of molten glass into the upper receiving ends of their respective stationary chutes E, F, G, and H. The stationary chutes E have their lower outlet ends in vertical alignment with a double cavitied parison or blank mold 9 of the forming machine 1. The other stationary chutes F, G, and H similarly have their lower ends in vertical alignment with parison molds 9a, 9b, and 9c associated with the machines 2, 3, and 4, respectively. Therefore, depending upon the presentation of a particular set of deflecting chutes beneath the stationary funnels 8, the gobs of molten glass will be delivered to the preselected forming machine.

In order to provide an understanding of the operation of the forming machines in relation to the feeding and distributing means, a general description of the mechanism and operating cycle of one of the forming machines, such as machine 1, follows:

A double cavitied parison mold 9 mounted below and axially aligned with the outlet ends of the stationary chutes E is adapted to be raised and lowered by suitable power driven mechanism 10 and receive gobs of molten glass during the elevating thereof to an operating position relative to a horizontal rotatable turret 11. The turret 11, which rotates in the direction shown by the arrow 12 on FIG. 2, is driven from above by means of depending drive shaft 13 connected at the center thereof. A stop and lock mechanism 14 controls the final positioning of the turret 11 as it is indexed. The turret 11 provides the support for annular neck rings 15 and the upper open end of the parison mold 9 in its operating position is brought into abutting relationship therewith so that the cavities of the neck rings 15 and the upper openings of the mold 9 are in registery.

While only a single pair of radially spaced neck rings 15 are shown on the turret 11 of FIG. 1, it should be understood that there can be three pairs of radially spaced neck rings on the turret 11, preferably spaced approximately 120° apart. As can readily be seen, the gobs of molten glass, as they fall from the lower end of stationary chutes E, will pass through the neck rings 15 into the cavities of the parison mold 9 positioned therebelow. After the gobs have been delivered to the parison mold 9, a pair of plungers 16 mounted above the turret 11 are preferably moved horizontally until they are in vertical alignment with the openings in the neck rings 15 and are then moved vertically downward through the neck rings and into pressing position with their lower ends extending into the cavities in the parison mold 9. After the pressing has been completed, the plungers 16 are retracted until their lower ends clear the neck rings 15 and simultaneously the parison mold 9 is lowered until the formed parisons which depend from the neck rings 15 will have sufficient clearance to pass over the upper surface of the parison mold 9.

The turret 11 is then indexed 120° to the next station, where a partible blow mold 17 is closed about the formed parison and the parison is blown to form an article into its final shape. The blow mold 17 is then opened and the turret again indexed 120° wherein the formed articles are then positioned at a takeout station. At the takeout station, a pair of vertically movable transfer and cooling heads 18 are elevated until in contact with the article at which time the neck rings are opened to release the articles to the transfer heads 18. The transfer heads 18 are retracted to lower the articles so that a suitable transfer arm 19, actuated in a well-known manner through the operation of mechanical linkage means under the influence of a cam 31a, will sweep the formed articles from the transfer heads 18, onto a continuously moving horizontal belt conveyor 20. The conveyor 20 carries the formed articles from the forming machine to the next operation, usually the tempering or annealing of the glass.

While the above description has been limited to the operation of one of the forming sections, it should be pointed out that the other three forming sections 2, 3, and 4 operate in cycles substantially identical with that described for the one machine. For example, double gobs of molten glass are fed to the blank molds 9a, 9b, and 9c in succession and the turrets 11a, 11b, and 11c are rotated in synchronized sequence about their respective axes in the direction of the arrows 12. Thus the machines, positioned diagonally with respect to each other, will have turrets indexing in the same direction while adjacent machines have their turrets indexing in opposite directions.

The motive power for the timing of the forming machine operations is derived from a constant speed drive motor 21 and a source of hydraulic pressure for operating the various mechanism on the machine is derived from the motor and pump shown generally at 22 on FIG. 2. A reduction gear 23 is connected to the output of the motor 21 and in turn drives output shaft 24 which extends between the forming machines to a position midway of the base of the machines. A shaft 25, geared to the extending end of shaft 24, extends vertically upward coaxially with the central axis of the group of machines. The shaft 25 through the intermediary of an indexing mechanism 35 (to be described later) rotates a shaft 46 connected to the arms 47 carrying deflecting chutes A, B, C, and D in proper timed sequence.

Referring specifically to FIG. 3, the deflector chutes A are shown in position to receive gobs of molten glass from funnels 8 and to deliver the received gobs to the upper end of the stationary chutes E. For the purpose of simplification of disclosure only, the lower end of one of the stationary chutes E is schematically shown extending down through a sleeve X. It should be understood that all the chutes E–H are similarly arranged. The sleeve X is mounted for vertical movement relative to a supporting frame Y and telescopes over chutes E. The sleeve X additionally serves to guide the pressing plungers 16 in their vertical movement.

The details of the plunger operation and the mechanism for carrying out the pressing of the parisons does not form a part of this invention and is more fully described in application Serial No. 845,238, filed October 8, 1959, for Mechanism for Pressing Charges of Molten Glass in a Forming Mold, owned by the assignee of this application. The referred to application fully discloses the manner in which the sleeve X cooperates with the support Y.

From the above description the general operation of the forming machines and their relationship to each other should be readily apparent.

Figure 5:
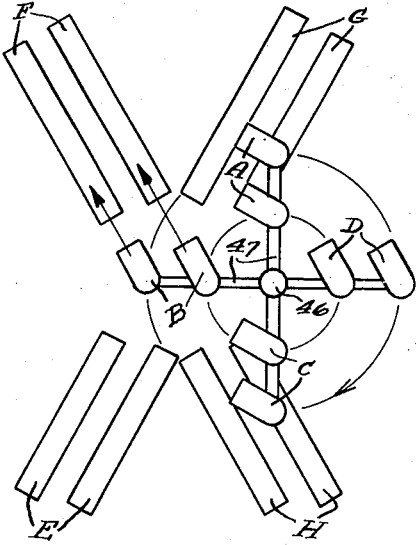
Figure 6:
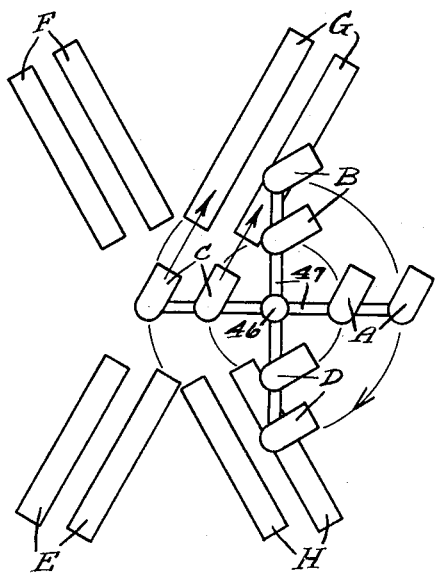
Figure 7:
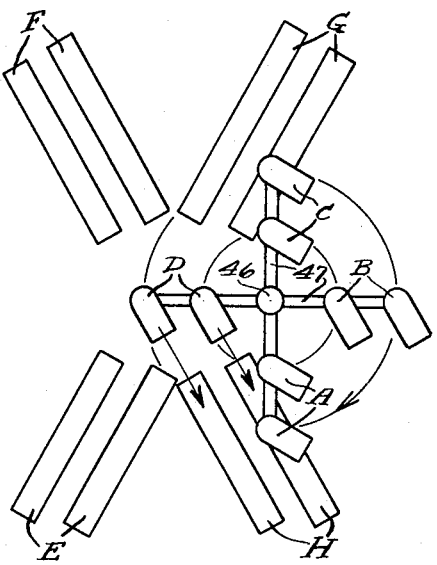

Referring to FIGS. 4–7, there is schematically shown the four successive positions of the deflector chutes A, B, C, and D relative to the stationary chutes E, F, G, and H. FIG. 4 illustrates the position in which deflectors A are directly below the funnels 8 and in position to deflect a pair of gobs of molten glass to the stationary chutes E. FIG. 5 shows the deflectors B in position for receiving gobs of molten glass and to direct the gobs to stationary deflectors F. FIG. 6 shows the deflectors C in position to direct gobs of molten glass to the stationary chutes G and similarly in FIG. 7 the chutes D are in position to direct gobs of molten glass to the stationary chutes H. As was pointed out previously, each set of stationary chutes is intended to direct the gobs of molten glass to an individual forming machine.

By providing the particular arrangement disclosed above for distributing the gobs of molten glass to the forming machines 1, 2, 3, and 4, it is possible to make the path of travel of gobs substantially equal in length. Furthermore, the four parison molds 9, 9a, 9b, and 9c of the respective forming machines are located in a common horizontal plane and are substantially equi-distant from the feeder orifice when in their gob receiving positions. Thus the time required for the pair of gobs to reach the parison mold will be substantially the same regardless of which of the four parison molds is being charged during the normal cycle of the machines. By providing such an arrangement the gob deflectors will be successively positioned beneath the orifices at equal time increments.

Furthermore, and more important, the distance of travel of an individual gob is substantially identical with that of any other gob, thus insuring that the double gobs reach the parison mold at the same instant. This is an important consideration from the standpoint of uniformity of ware produced and the proper timing of the various machine operations discussed above.

Referring to FIGS. 8 and 9, there is illustrated the mechanism for driving and indexing the deflectors A–D. A power shaft 25 is supported near its upper end by a sleeve bearing 26 and is the motive means for the timing arrangement of the machines. A spur gear 27 connected to the shaft 25 meshes with a ring gear 28 which in turn is coupled to a cam drum 29 mounted on a support structure 33. The cam drum 29 has the usual external slots 30 which accommodate cams 31. The cams 31 operate various control units in a preselected sequence through the intermediary of cam followers 32.

The deflecting chutes A, B, C, and D are mounted in pairs at the outer ends of cross arms 47. The cross arms 47 are connected at their center to a vertical shaft 46. A particular drive for the shaft 46 is contained within a housing 35 and is a commercially available unit of the Ferguson Machine and Tool Company. The particular drive will be described in general terms so as to provide an understanding of its functional relationship to the rest of the device and to explain its operation. An extension 25a of the shaft 25 drives a helical gear 36 in mesh with a gear 37 fixed to a horizontal shaft 38 rotatably supported in the housing 35. The shaft 38 in turn has a spur gear 39 mounted thereon for rotation therewith. The spur gear 39, through an idler gear 40, drives a spur gear 41 mounted on a second horizontal rotatable shaft 42 which also is provided with bearings carried by the housing 35. The shaft 42 has an annular cam 43 mounted thereon for rotation therewith. Thus it can be seen that the cam 43 is rotated at a substantially constant speed by means of the timer motor 21. The shaft 46 which carries the cross arms 47 has a series of rollers 44 spaced 90° apart around the bottom periphery thereof. These rollers 44 mesh with the cam 43 such that the shaft 46 is rotated 90° and then remains at this rotated position for an interval of time determined by the shape of the cam 43 and then again rotated 90°. Thus an intermittent rotation of the shaft 46 and the deflector carrying arms 47 is provided.

The operation of the gob distributing apparatus of the invention may be summarized as follows:

A double orifice feeder is operated in a continuous manner to deliver a pair of gobs at predetermined intervals of time to the stationary gob guiding funnels 8. The deflector chutes A–D arranged in pairs on the ends of the cross arms 47 are presented, a pair at a time, beneath the funnels 8 and guide the gobs of molten glass to the stationary gob chutes E–H in succession.

By positioning the forming machines so that the blank mold stations are equispaced from the feeder, the gobs of glass being fed thereto will have the same length of travel, greatly simplifying the timing of the machine operations and indexing of the deflector chutes.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. An apparatus for distributing pairs of gobs of molten glass from a pair of orificial openings to a group of four glass forming units positioned therebelow, said apparatus comprising a horizontal member, means mounting said member for rotation about a vertical axis which is laterally displaced from said orificial openings, four pairs of curved gob deflectors, means mounting each pair of deflectors to said horizontal member, in circumferentially spaced 90° intervals about the axis of said member with the deflectors of each pair of deflectors being on the same radius of said member and in parallel relationship, and the diametrically opposed pairs of deflectors being mounted on said member with their curved axes in parallel relationship to each other.

2. Apparatus for distributing successively formed pairs of gobs of molten glass issuing from a pair of orificial openings to a group of four glass forming machines spaced about a vertical axis passing midway between said openings, each said machine having double cavity parison molds, said apparatus comprising in combination, pairs of stationary gob chutes individual to each machine, said pairs of gob chutes having their lower ends in alignment with the said mold cavities of each machine and their upper ends curved toward the orificial openings but spaced therebeneath, a horizontally disposed frame having radially extending arms, means mounting said frame for rotation about a vertical axis which is laterally displaced from the vertical axis passing between said pair of orificial openings with the arms passing between the space beneath the openings and the upper ends of the gob chutes, a pair of curved gob deflectors mounted on each said arm in parallel relationship with each other and spaced apart a distance equal to the spacing of said orificial openings, the curvature of two of said pairs of deflectors describing parallel vertical planes that intersect their respective arms at the same acute angle and the other two pairs of deflectors describing vertical planes that intersect their respective arms at the same obtuse angle, and means for intermittently rotating said frame to successively present said pairs of deflectors in alignment with said orificial openings.

References Cited in the file of this patent
UNITED STATES PATENTS

| | | |
|---|---|---|
| 1,187,324 | Ibberson | June 13, 1916 |
| 1,191,868 | Bowen | July 18, 1916 |
| 2,531,526 | Patterson | Nov. 28, 1950 |
| 2,637,429 | Pond | May 5, 1953 |
| 2,926,457 | Trudeau | Mar. 1, 1960 |